United States Patent [19]

Ewing

[11] Patent Number: 4,796,854
[45] Date of Patent: Jan. 10, 1989

[54] BALANCED SOLENOID VALVES

[75] Inventor: James H. Ewing, Brockton, Mass.

[73] Assignee: MKS Instruments, Inc., Andover, Mass.

[21] Appl. No.: 50,900

[22] Filed: May 18, 1987

[51] Int. Cl.[4] .................... F16K 31/02; F16K 39/02
[52] U.S. Cl. ................... 251/129.07; 251/282; 251/337
[58] Field of Search ............. 251/129.07, 129.15, 251/129.18, 282, 337

[56] References Cited

U.S. PATENT DOCUMENTS

| | | | |
|---|---|---|---|
| 1,153,681 | 9/1915 | Fulton | 251/282 X |
| 1,396,501 | 11/1921 | Brooks | 251/282 X |
| 1,772,406 | 8/1930 | Whiton | 251/282 X |
| 3,009,678 | 11/1961 | Soderberg et al. | 251/282 X |
| 3,214,134 | 10/1965 | Noaks | 251/282 |
| 3,627,257 | 12/1971 | Stampfli | 251/282 X |
| 3,949,964 | 4/1976 | Freeman | 251/129.07 X |
| 4,493,474 | 1/1985 | Ohyama | 251/282 X |
| 4,569,504 | 2/1986 | Doyle | 251/129.15 X |
| 4,635,683 | 1/1987 | Nielson | 251/129.15 X |

*Primary Examiner*—John Rivell
*Attorney, Agent, or Firm*—James E. Mrose

[57] ABSTRACT

A proportional-control solenoid-actuated fluid valve, capable of governing relatively large volumes and rates of flow swiftly and accurately with expenditure of relatively little electrical power, includes a movable valving member positioned by an armature having a substantially frictionless spring suspension, the armature being under influence of a special force-counterbalancer in the form of a bellows proportioned and disposed to exert upon it, automatically, neutralizing forces which are substantially equal and opposite to unavoidable pressure-induced imbalances afflicting the valving member. The same pressures which tend to unbalance the valve member are impressed upon opposite sides of the bellows, one through an enabling bleed port, and resulting forces developed by the bellows over a defined area are exerted upon the armature mechanically in a counterbalancing sense.

2 Claims, 1 Drawing Sheet

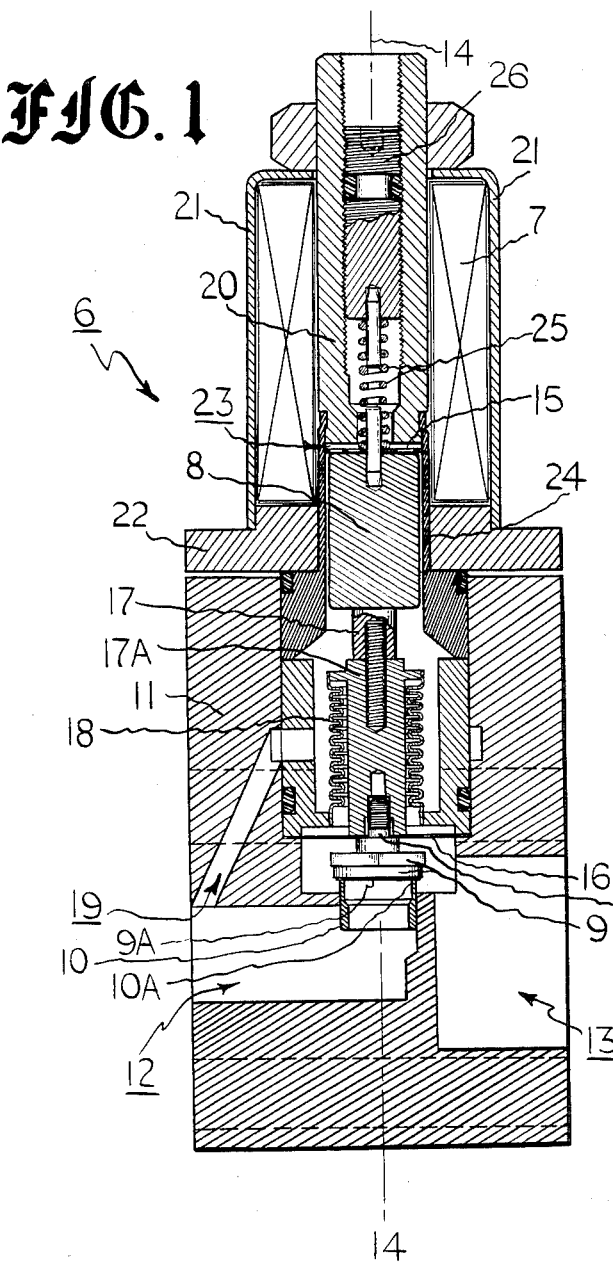
FIG. 1
FIG. 2
FIG. 3
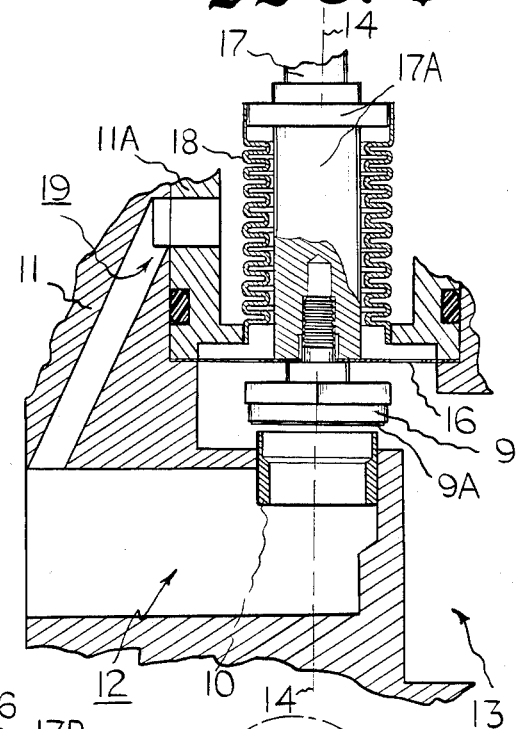
FIG. 4
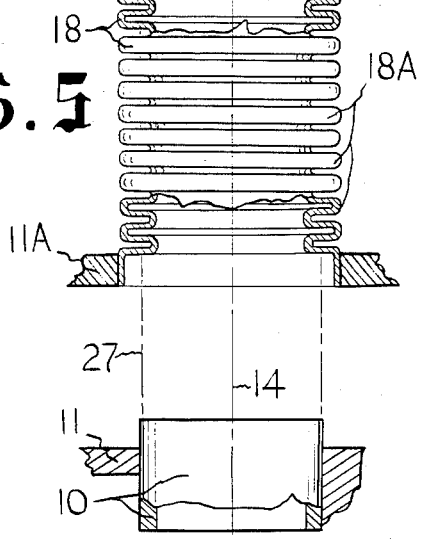
FIG. 5

BALANCED SOLENOID VALVES

BACKGROUND OF THE INVENTION

The present invention relates to improvements in solenoid-actuated proportional-control valves, and, in one particular aspect, to a unique and advantageous electrically operated fluid valve of low-cost and uncomplicated construction which accurately controls high-volume flows with the aid of a frictionless suspension and a pressure-counterbalancing bellows cooperating with its movable valving member.

Fluid valves exist in a wide variety of forms and sizes, serving a multitude of purposes, handling flowable materials whose characters range from light gaseous to heavy slurries and near-solids, and operable at various speeds under controls as diverse as simple binary (ON-OFF), proportional, direct-manual and remote-electrical. Those which would be capable of responding quickly to govern even relatively large flows with precision, and with expenditure of little electrical power, are of special interest in certain industrial processing, such as the flowmeter-controlled automatic regulation of flows of gases in semiconductor and integrated-circuit manufacture, and the improvements disclosed here are aimed at satisfying the demanding requirements which attend such uses. One of the serious problems commonly encountered has to do with disturbing effects of line pressures, which can have undue adverse influences on behavior of a valving member at or near closure; others have to do with friction, and with the large control forces which must be developed if broad-area flow passages are to be valved in accommodation of high rates and volumes of flow.

It has been recognized that pressure in the flow lines being controlled may be exploited to develop forces in aid of valving there, and that has resulted in classes of multi-stage valves in which, for example, a readily-actuated sensitive pilot stage is used, in turn, to regulate applications of the line pressures to a larger main valve in a bootstrapping manner which effectively amplifies the control to the pilot. Also, it has of course been well understood that products of pressures times areas acting on various surfaces represent forces whose magnitudes and directions can be employed usefully either to produce or resist displacements of movable members. As will be found from what is described here, a highly beneficial counterbalancing of certain normally-disturbing imbalances produced by fluid pressure differentials is consonant with related principles.

SUMMARY OF THE INVENTION

In a preferred expression of this invention, a relatively large-area valving member is carried by a frictionless spring suspension which allows for its short-stroke axial movements into and away from seated engagements with a valve seat having a flow passage of relatively large cross-section located between upstream and downstream portions of a flow path through a valve body. The valve stem structure by which the valving member is suspended and actuated includes a magnetic solenoid core or armature which may be drawn within a relatively stationary annular electrical solenoid winding to different extents, in proportion to electrical excitations of the winding, thereby correspondingly unseating the normally-closed valving member. Between the valve stem structure and the valve body, coaxially along the axis of relative movement, there are interposed the multiple corugations of an axially-expandable metal bellows which is tightly sealed between sites of upstream and downstream pressures in the valve body. The effective circular diameter for the path along which the radially-thin annular bellows corrugations may be stretched and compressed in the axial direction is intentionally made substantially the same as the effective diameter of the valve seat flow passage, and the valving member is so disposed in relation to the seat that pressure differentials developing forces upon that member in one axial direction are effective simultaneously to develop counterbalancing forces upon its stem by way of the bellows. The solenoid armature, and the valving member which moves with it, may thus be axially displaced, within at least a short range, without having to overcome pressure-induced bias, and electrical power requirements may therefore be kept low and reliably and uniformly related to the valving which will occur.

Accordingly, it is one of the objects of this invention to provide novel and improved proportional-control solenoid-type valves which can swiftly and accurately govern even relatively large volumes and high rates of fluid flow using relatively low levels of electrical power, aided by force counterbalancing achieved through use of a bellows-type coupling.

A further object is to promote unique and advantageous sensitive and precise fluid valving by way of the frictionless suspension of a broad-area valving member and the counterbalancing of undesirable pressure-generated forces through a correlated pressure-responsive coupling.

BRIEF DESCRIPTION OF THE DRAWINGS

Although those aspects of this invention which are considered to be novel are expressed in the appended claims, further details as to preferred practices and as to further objects and features thereof may be most readily comprehended through reference to the following detailed description when taken in connection with the accompanying drawings, wherein:

FIG. 1 provides a transverse cross-section of an improved solenoid valve constructed in accordance with the present teachings, certain of the internal components being portrayed in full rather than cross-sectioned;

FIG. 2 is a plan view of one of the armature guide springs in the valve of FIG. 1;

FIG. 3 is a plan of the second armature guide spring in the valve of FIG. 1;

FIG. 4 illustrates a portion of the FIG. 1 valve on a somewhat enlarged scale and in a different operating condition, partly in cross-section; and FIG. 5 depicts relationships between the valve seat and balancing bellows in valve such as that of FIGS. 1 and 4, together with linework characterizing their effective areas involved in pressure counterbalancing.

DETAILED DESCRIPTION OF THE PREFERRED EMBODIMENTS

Having reference to the drawings, wherein like reference characters designate identical or corresponding components and units throughout the several views, and more particularly to FIG. 1 thereof, a precision high-flow-rate valve 6, which is capable of proportional-control valving of large volumes of fluid under influence of only relatively low-power electrical control signals, is shown to include an annular electrical solenoid coil 7 associated with a movable magnetic armature core fixed with a valving member 9 disposed to open and close a flow path through a stationary valve seat 10. A valve body 11 supports and orients the various parts, and includes an upstream inlet port 12 communicating directly with a downstream outlet port 13 solely through the annular seat 10. That separately-fashioned fitted seat is preferably formed with but a narrow upper rim, 10A, against which the elastomeric face pad 9A of valving member 9 may be closed in a fluid-tight sealing relation when the solenoid coil 7 is essentially unenergized. The seat, valving member and armature are aligned collinearly with a vertical axis, 14—14, along which the valving movements take place. Centering and wholly frictionless suspension of the movable valving elements and armature are achieved by a spaced pair of flat springs, 15 and 16, whose outer peripheries are fastened with the valve body and whose inner peripheries are respectively fixed with the armature core 8 and a central valve stem structure 17 extending between the armature core and the valving member 9. Importantly, for a pressure-counterbalancing which essentially isolates this valve from certain deleterious influences of differentials of pressure appearing across upstream and downstream boundaries of the valving member, the valve stem and body are bridged and sealed by an axially-compliant bellows 18 whose interior is exposed to downstream pressures in the valve and whose exterior is exposed to upstream pressures via an accommodating body passageway 19.

In a generally-conventional way, electrical excitation of the solenoid coil 7 develops magnetic flux which toroidally encircles it, traversing its axially-centered core 20 and its outer cover 21 and a lower mounting flange 22, all of which are of appropriate magnetic material. However, there is a central air gap 23 which remains unclosed by that magnetic material; it is left between the lower end of solenoid core 20 and the upper end of the aforementioned armature core 8. A non-magnetic (stainless steel) hollow sleeve 24 is welded to and mechanically interconnects the lower end of solenoid core 20 with the main valve body 11, and has a sufficiently large central axial opening to just freely accommodate axial movements of armature 8. The latter movements occur in the upward direction, tending to shorten the gap 23, when larger control currents are driven through coil 7 by a suitable source, such as an output amplifier stage of a controller which may be associated with a flowmeter sensing conditions which are to be regulated by valve 6. In its quiescent state, with essentially no net current being driven through its coil, the solenoid does not draw the armature upwardlly in a gap-closing action, and, instead, the armature simply tends to rest somewhat neutrally in a lowermost position (illustrated in FIG. 1) at which the interconnected valving member 9 engages and seals itself upon the seat 10 to block flow between inlet 12 and outlet 13. Stable centering ad frictionless suspension of the armature and valving member by the two flats springs 15 and 16 preferably involves a wide spacing of them, and, accordingly, the thin flat spiral unit 15 (FIG. 2) is fitted between the top of the armature and interior of the stainless steel sleeve (FIG. 1), while the triple-arm spider unit 16 (FIG. 3) is fitted between a lower portion, 17B, of the valve stem structure and the surrounding body (FIG 1). To insure that firm fluid-tight closure of the valve will occur under zero-excitation conditions, a light controllable downward bias force is provided by a small helical spring 25 which is adjustably compressible and settable by an associated set screw 26 threadedly fitted within the accommodating hollow interior of central solenoid core member 20. That spring, 25, exerts the controlled and regular bias force between the set screw and the top of the movable armature core 8.

Even though the closure-biasing force applied by set spring 25 is only quite small, and even though there is a relatively large area of the face 9A of the valving member 9 which may be exposed to high upstream pressures in inlet port 12, the improved valve does not become forced open unintentionally. That is so because of continual automatic application of counteracting forces which are applied in amounts just equal to the imbalance force which would otherwise exist due to fluid pressure effects. Therefore, essentially only the small bias of spring 25 and relatively small spring restraints of the centering springs 15 and 16 need to be overcome when control currents in the solenoid dictate that the valving member be lifted from its seat to varying extents for swift control of different amounts of fluid flow. Although flexible bellows 18 will nevertheless resist stretching and compressing to some degree, the forces involved are virtually negligible, particularly where, as shown, there are many thin and axially-compliant folds or convolutions stacked together. Moreover, the bellows ribs which so conveniently yield well axially also advantageously tend to be highly rigid radially and can therefore withstand net fluid pressures acting in those spurious directions. Importantly, the bellows is securely sealed both mechanically and fluid-tight, as by welding, around its upper end, with an upper valve stem portion 17A, and around its lower end, with the cooperating sleeve member 11A inserted into and sealed with the valve body as a part thereof. On its interior, bellows 18 always witnesses whatever pressures exist donwstream of valving member 9, the same as those at fluid outlet port 13. However, on its exterior surfaces, the pressures always witnessed are the same as those at the upstream inlet port 12, because such pressures are coupled between those sites by the body passageway 19. The various illustrated O-ring seals insure that there is no leakage of the controlled fluid and that the aforesaid differences in pressures will be experienced by the bellows.

A somewhat exaggerated opened condition of the valve is represented in FIG. 4, and it should be understood that only a very small axial motion and maximum seat clearance is required to achieve full opening and a high flow volume with the relatively large-area seat passage and valving member involved in such a valve. Typically, a maximum span of only about fifteen thousandths of an inch of motion need occur, and that small order of displacements insures that the suspension springs 15 and 16 can exert little restraint and that bellows 18 will neither be overstressed nor add any noticeable unwanted forces.

Dashed linework 26 in FIG. 5 characterizes the circular outline about which relative axial motion via the bellows is effective. It lies between the radially inner and outer reaches of the convolutions or ribs 18A, and, for greatest accuracy, may be determined empirically with bellows of different origins, materials and constructions. As is indicated by the further dashed linework 27, the region for relative motion established by the bellows is selected to have about the same limits as the passageway of seat 10, which then insures that the upward forces which are the products of seat area times inlet pressure will be counterbalanced by downward forces which are products of the same inlet pressure times the like effective area established by the bellows. Even when the valve is opened and fluid flows, the valving member tends to experience different pressures above and below it, which would result in unwanted net forces unless counterbalancing also occurred; but, such counterbalancing does always take place with aid of the bellows, which likewise experiences substantially the same different pressures and thus occasions the needed equal and opposite counteracting forces.

In other constructions the valving or plug members, and cooperating seats, may have configurations specifically different from what has been illustrated, and the counterbalance bellows may therefore not have a like outline while yet offering the needed force offset and related advantages. Also, bellofram-type or diaphragm-type frictionless counterbalance couplings may in some cases be able to contribute useful compensations. Accordingly, it should be understood that the embodiment and practices described in connection with this specification have been presented by way of disclosure rather than limitation, and that various modifications, combinations and substitutions may be effected by those skilled in the art without departure either in spirit or scope from this invention in its broader aspects and as set forth in the appended claims.

What I claim as new and desire to secure by Letters Patent of the United States is:

1. Fluid valving apparatus comprising a valve body having fluid inlet and outlet ports, a valve seat having a passageway for connecting said ports, a valving member, a stem structure fixed with said valving member, substantially frictionless means suspending said stem structure in said body in support of said valving member for movements thereof along an axis toward and away from said seat in nearby positions where fluid pressure differences appear across said valving member and create first net forces tending to move said valving member in one direction along said axis, solenoid control means for moving and setting the position of said valve stem structure and valving member along said axis to govern flow of fluid between said ports through said seat passageway, said solenoid control means including an electrical solenoid winding fixed with said body and a cooperating relatively movable armature of magnetic material fixed with and movable with said stem structure along said axis, said substantially frictionless means including at least a pair of flat springs connected between said stem structure and said body at axially-spaced positions along said axis, yieldable frictionless motion-accomodating seal means connected fluid-tight between said stem structure and said valve body and allowing substantially frictionless relative movement therebetween along said axis, said motion-accommodating seal means comprising a metal bellows defining a closed path along which it accommodates said relative movements whose enclosed effective area, transverse to said axis, is about the same as that of said seat passageway and the confronting surfaces of said valving member, transverse to said axis, means exposing those surface areas of said stem structure which are transverse to said axis and lie to one side of the seal provided by said motion-accommodating seal means to pressures at said inlet and simultaneously exposing those surfaces of said stem structure which are transverse to said axis and lie to the other side of the seal provided by said motion accommodating seal means to pressures at said outlet, whereby said stem structure is subjected to second net forces along said axis which are related to differences in pressures at said inlet and outlet and which are of substantially the same magnitude as said first net forces and in direction opposite thereto, and adjustable biasing-spring means exerting force between said body and said stem structure along said axis in direction to bias said valving member toward closure with said seat.

2. Fluid valving apparatus as set forth in claim 1 wherein said means exposing said surface areas which lie to said one side of said seal includes a fluid bleed passageway in said body applying pressures of said inlet to said surface areas which lie to said one side of said seal, wherein said valving member is disposed on the downstream side of said valve seat, and wherein said biasing-spring means comprises a set-screw member threadedly adjustable in said body along said axis and a spring compressed between said set-screw member and said stem structure and urging closure of said valving member against said seat in the absence of solenoid actuation of said armature by said soleniod winding.

* * * * *